US012423069B1

(12) United States Patent
Morello et al.

(10) Patent No.: US 12,423,069 B1
(45) Date of Patent: Sep. 23, 2025

(54) ARTIFICIAL INTELLIGENCE-BASED SOFTWARE IMAGE RECIPE CREATION AND USES THEREOF

(71) Applicant: MINIMUS LTD, Tel Aviv (IL)

(72) Inventors: John Morello, Baton Rouge, LA (US); Ben Bernstein, New York, NY (US); Dima Stopel, Herzliya (IL)

(73) Assignee: MINIMUS LTD, Tel Aviv (IL)

( * ) Notice: Subject to any disclaimer, the term of this patent is extended or adjusted under 35 U.S.C. 154(b) by 0 days.

(21) Appl. No.: 19/227,007

(22) Filed: Jun. 3, 2025

(51) Int. Cl.
| | |
|---|---|
| *G06N 20/00* | (2019.01) |
| *G06F 8/35* | (2018.01) |
| *G06F 21/55* | (2013.01) |
| *G06F 21/62* | (2013.01) |
| *G06F 8/10* | (2018.01) |

(Continued)

(52) U.S. Cl.
CPC .............. *G06F 8/35* (2013.01); *G06F 8/10* (2013.01); *G06F 8/20* (2013.01); *G06F 8/75* (2013.01); *G06F 8/77* (2013.01); *G06F 11/328* (2013.01); *G06F 11/3684* (2013.01); *G06F 11/3688* (2013.01); *G06F 11/3698* (2025.01); *G06F 21/554* (2013.01); *G06F 21/577* (2013.01);

(Continued)

(58) Field of Classification Search
CPC ..... G06F 8/35; G06F 8/75; G06F 8/10; G06F 8/20; G06F 8/77; G06F 21/554; G06F 21/577; G06F 11/3688; G06F 11/328; G06F 11/3684; G06F 11/3698; G06N 20/00; G06N 3/0895; G06N 3/08; G06N 3/0475
See application file for complete search history.

(56) References Cited

U.S. PATENT DOCUMENTS

| | | |
|---|---|---|
| 9,959,104 B2 | 5/2018 | Chen et al. |
| 9,983,891 B1 | 5/2018 | Christensen |

(Continued)

FOREIGN PATENT DOCUMENTS

| | | |
|---|---|---|
| CN | 111522628 A | 8/2020 |

OTHER PUBLICATIONS

"Announcing 'Yum + RPM for Containerized Applications'—Nulecule & Atomic App," Red Hat Blog (Jun. 23, 2015) (available at https://www.redhat.com/en/blog/announcing-yum-rpm-containerized-applications-nulecule-atomic-app) (last accessed Nov. 7, 2024, at 4:27 PM Eastern time).

(Continued)

*Primary Examiner* — Anibal Riveracruz
(74) *Attorney, Agent, or Firm* — M&B IP Analysts, LLC

(57) ABSTRACT

A system and method for building software image. A method includes generating a prompt based on an input portion of application-identifying data; prompting a generative artificial intelligence model using the prompt in order to output text indicating a plurality of software packages, wherein each software package is a set of code for performing a plurality of functions of an application; generating a software image recipe based on the output text, wherein the software image recipe is a file including a set of instructions that cause a processing circuitry to build the software image by combining the plurality of software packages when executed; and building the software image by executing the software image recipe via the processing circuitry, wherein the software image causes deployment of a software component when executed, wherein the software component is configured to perform the plurality of functions of the application.

19 Claims, 8 Drawing Sheets

(51) Int. Cl.

| | | |
|---|---|---|
| G06F 8/20 | (2018.01) | |
| G06F 8/75 | (2018.01) | |
| G06F 8/77 | (2018.01) | |
| G06F 11/32 | (2006.01) | |
| G06F 11/3668 | (2025.01) | |
| G06F 11/3698 | (2025.01) | |
| G06F 21/57 | (2013.01) | |
| G06N 3/0475 | (2023.01) | |
| G06N 3/08 | (2023.01) | |
| G06N 3/0895 | (2023.01) | |

(52) U.S. Cl.
CPC ............ *G06N 3/0475* (2023.01); *G06N 3/08* (2013.01); *G06N 3/0895* (2023.01); *G06N 20/00* (2019.01)

(56) References Cited

U.S. PATENT DOCUMENTS

| | | | |
|---|---|---|---|
| 10,505,830 B2 | 12/2019 | Mishalov et al. | |
| 10,885,378 B2 | 1/2021 | Li et al. | |
| 11,062,022 B1 | 7/2021 | Kalamkar et al. | |
| 11,182,140 B2 | 11/2021 | Riek et al. | |
| 11,599,348 B2 | 3/2023 | Goldmann et al. | |
| 11,669,362 B2 | 6/2023 | Singh et al. | |
| 11,972,333 B1* | 4/2024 | Horesh | G06N 3/0475 |
| 12,095,806 B1 | 9/2024 | Nemtsov et al. | |
| 12,099,414 B2 | 9/2024 | Mitkar et al. | |
| 12,242,994 B1 | 3/2025 | Aggarwal et al. | |
| 12,267,345 B1 | 4/2025 | Erlingsson et al. | |
| 2012/0324446 A1 | 12/2012 | Fries et al. | |
| 2015/0365437 A1 | 12/2015 | Bell, Jr. et al. | |
| 2017/0147813 A1 | 5/2017 | McPherson et al. | |
| 2019/0347127 A1 | 11/2019 | Coady et al. | |
| 2020/0159536 A1 | 5/2020 | Saidi | |
| 2020/0213357 A1 | 7/2020 | Levin et al. | |
| 2020/0285504 A1 | 9/2020 | Siegmund | |
| 2020/0326931 A1 | 10/2020 | Nadgowda et al. | |
| 2021/0157623 A1 | 5/2021 | Chandrashekar et al. | |
| 2021/0208916 A1* | 7/2021 | Wang | G06F 16/54 |
| 2021/0255840 A1 | 8/2021 | Novy | |
| 2021/0319109 A1 | 10/2021 | Weng et al. | |
| 2022/0147378 A1 | 5/2022 | Tarasov et al. | |
| 2022/0166626 A1 | 5/2022 | Madisetti et al. | |
| 2023/0168986 A1 | 6/2023 | Larkin et al. | |
| 2024/0069883 A1 | 2/2024 | Griffin et al. | |
| 2024/0103833 A1 | 3/2024 | Shemer et al. | |
| 2024/0134967 A1 | 4/2024 | Yaron et al. | |
| 2024/0411674 A1* | 12/2024 | Zmigrod | G06F 11/3684 |
| 2025/0004741 A1 | 1/2025 | Hubik | |
| 2025/0123819 A1* | 4/2025 | Khemka | G06N 20/00 |
| 2025/0156535 A1* | 5/2025 | Keller | G06F 21/566 |

OTHER PUBLICATIONS

Ian Gorton et al.; Components in the Pipeline; IEEE; pp. 34-40; retrieved on Jul. 18, 2025 (Year: 2025).

* cited by examiner

ARTIFICIAL INTELLIGENCE-BASED SOFTWARE IMAGE RECIPE CREATION AND USES THEREOF

TECHNICAL FIELD

The present disclosure relates generally to software image management, and more specifically to building software images using AI-generated software image recipes.

BACKGROUND

Software images are files containing code and other resources used to realize one or more software components. Example software images include software container images used to realize software containers, as well as virtual machine (VM) images used to realize virtual machines. Executing the code within a software image causes a software component such as a container or virtual machine to be deployed within a computing environment.

Updates in code included in software images may result in changes to how the corresponding software component behaves. Code may be updated, for example, to improve software performance or to patch out vulnerabilities. For example, when a vulnerability in code may expose the software component to cybersecurity threats, the code of the software component used to realize that software component may be updated in order to patch out the vulnerability. As a result, maintaining software images can serve to maintain performance and/or security within a computing environment.

Solutions which aid in maintaining software images would therefore be desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for building software images. The method comprises: generating a prompt based on an input portion of application-identifying data; prompting a generative artificial intelligence model using the prompt in order to output text indicating a plurality of software packages, wherein each software package is a set of code for performing a plurality of functions of an application; generating a software image recipe based on the output text, wherein the software image recipe is a file including a set of instructions that cause a processing circuitry to build the software image by combining the plurality of software packages when executed; and building the software image by executing the software image recipe via the processing circuitry, wherein the software image causes deployment of a software component when executed, wherein the software component is configured to perform the plurality of functions of the application.

Certain embodiments disclosed herein also include a non-transitory computer readable medium having stored thereon causing a processing circuitry to execute a process, the process comprising: generating a prompt based on an input portion of application-identifying data; prompting a generative artificial intelligence model using the prompt in order to output text indicating a plurality of software packages, wherein each software package is a set of code for performing a plurality of functions of an application; generating a software image recipe based on the output text, wherein the software image recipe is a file including a set of instructions that cause a processing circuitry to build the software image by combining the plurality of software packages when executed; and building the software image by executing the software image recipe via the processing circuitry, wherein the software image causes deployment of a software component when executed, wherein the software component is configured to perform the plurality of functions of the application.

Certain embodiments disclosed herein also include a system for building software images. The system comprises: a processing circuitry; and a memory, the memory containing instructions that, when executed by the processing circuitry, configure the system to: generate a prompt based on an input portion of application-identifying data; prompt a generative artificial intelligence model using the prompt in order to output text indicating a plurality of software packages, wherein each software package is a set of code for performing a plurality of functions of an application; generate a software image recipe based on the output text, wherein the software image recipe is a file including a set of instructions that cause a processing circuitry to build the software image by combining the plurality of software packages when executed; and build the software image by executing the software image recipe via the processing circuitry, wherein the software image causes deployment of a software component when executed, wherein the software component is configured to perform the plurality of functions of the application.

Certain embodiments disclosed herein include the method, non-transitory computer readable medium, or system noted above or below, wherein the set of instructions further indicates a location of the set of code of each software package.

Certain embodiments disclosed herein include the method, non-transitory computer readable medium, or system noted above or below, further including or being configured to perform the following step or steps: providing the generative artificial intelligence model access to a tool having at least one function, wherein the generative artificial intelligence model calls the at least one function of the tool in order to obtain data of the application, wherein the output text is generated by the generative artificial intelligence model based on the data of the application obtained by calling the at least one function of the tool.

Certain embodiments disclosed herein include the method, non-transitory computer readable medium, or system noted above or below, further including or being configured to perform the following step or steps: prompting the generative artificial intelligence model using text defining at least one function call for the tool, wherein the generative artificial intelligence model calls the at least one function of the tool using the at least one function call in order to obtain the data of the application.

Certain embodiments disclosed herein include the method, non-transitory computer readable medium, or system noted above or below, wherein each software package includes code of a subset of the plurality of functions of the application.

Certain embodiments disclosed herein include the method, non-transitory computer readable medium, or system noted above or below, wherein the generative artificial intelligence model is a language model.

Certain embodiments disclosed herein include the method, non-transitory computer readable medium, or system noted above or below, further including or being configured to perform the following step or steps: training the generative artificial intelligence model using a supervised machine learning process based on a labeled training data set including training inputs and corresponding training outputs, wherein the training inputs include a plurality of portions of training application-identifying data, wherein the training outputs include a plurality of corresponding labels representing respective software image recipe text outputs for the training inputs.

Certain embodiments disclosed herein include the method, non-transitory computer readable medium, or system noted above or below, further including or being configured to perform the following step or steps: deploying the software component by executing the software image.

Certain embodiments disclosed herein include the method, non-transitory computer readable medium, or system noted above or below, further including or being configured to perform the following step or steps: redeploying the software component when a cyber threat is detected with respect to the software component, wherein redeploying the software component further comprises rebuilding the software image using an updated version of at least one software package of the plurality of software packages.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
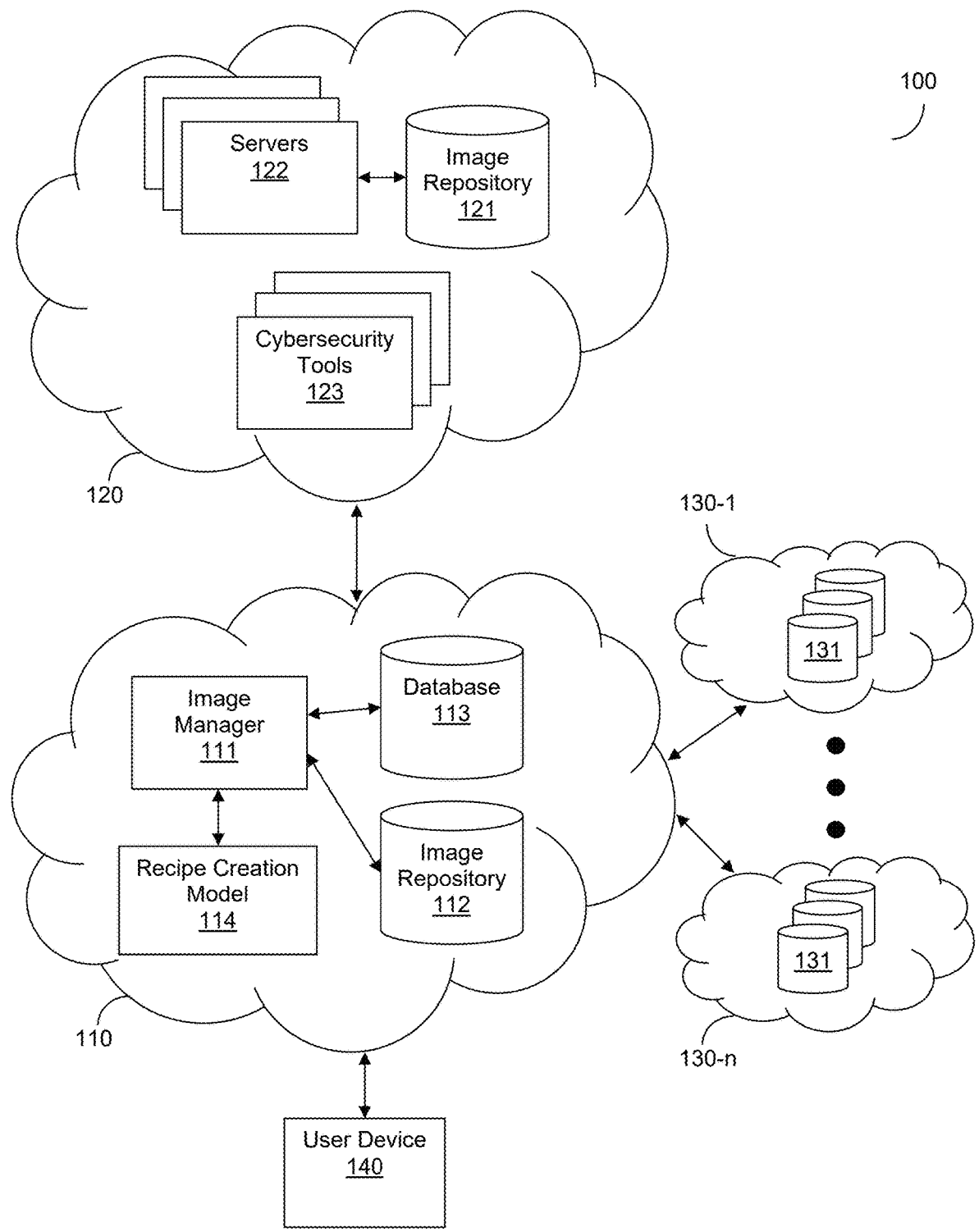
FIG. 1 is a network diagram utilized to describe various disclosed embodiments.

The various disclosed embodiments include techniques for creating software image recipes using artificial intelligence (AI). More specifically, various disclosed embodiments utilize language models such as, but not limited to, large language models (LLMs) in order to generate text which may be used as or otherwise used to generate software image recipes.

The set of instructions of each software image recipe may define a corresponding software image with respect to a combination of packages such that the software image built using a given software image recipe includes each package among the combination of packages of the software image recipe. To this end, the set of instructions of each software image includes a description of each package to be used for building the software image and a description of how to obtain a latest version or release of the code of each package.

The description of each package may be or may include an identifier (e.g., a name or identification number) of each portion of code used to create the package. The description of how to obtain the latest version or release of the code of each package may be or may include an indication of a location where each portion of code for each package is stored (e.g., in one or more code repositories). These descriptions may be generated by language models or otherwise based on outputs of language models created as discussed herein.

Based on inputs identifying an application for which a recipe is to be created, a language model is prompted. The language model is a generative artificial intelligence (AI) model, which may be or may include a machine learning model configured to output text predictions based on inputs including natural language text. The language model may be a large language model (LLM). In accordance with various disclosed embodiments, the language model is trained based on example text inputs indicating information about applications and, optionally, corresponding text outputs of software image recipe text (for example, descriptions of packages to be used for assembling the software image corresponding to the software image recipe being created).

The model may be trained based on training inputs including natural language text identifying example applications having software images defined by corresponding software image recipes. Such application-identifying text inputs may indicate aspects of the application such as, but not limited to, name of the application, path to the application (for example, a path within a certain code repository), both, and the like. In some embodiments, the model is trained using supervising learning based on a training set including the training inputs and corresponding labels representing respective software image recipe text outputs for those training inputs. The trained model may be applied to inputs among the training set or other inputs and used to obtain feedback in order to further tune the model before subsequent use.

In some embodiments, the model is provided access to one or more tools in order to allow the model to access data to be used for generating descriptions or other text of the software image recipes. For example, the model may be provided with one or more application programming interfaces (APIs) or otherwise provided with a set of functions to be used to query a code repository in order to obtain data related to an application for which a software image recipe is to be generated.

The various disclosed embodiments may be utilized for purposes such as, but not limited to, software image update management and securing computing environments via software image updates. Each software image is a file including executable code utilized to realize a given software component such as, but not limited to, a software container, a virtual machine, and the like. More specifically, each software image includes all of the code utilized to run a given software component, and may further include libraries, binaries, settings, and other data used to realize the corresponding software component. The recipes created using AI as discussed herein may be utilized for efficiently rebuilding and redeploying software images for use in computing environments.

More specifically, to facilitate building software images, various disclosed embodiments utilize software image recipes created as described herein in order to combine packages of code and configure images according to a set of heuristics. To this end, each software image recipe may be realized as a file including a set of instructions for building and configuring a software component such as a software container or virtual machine according to a predetermined definition of the software component. The set of instructions of each software image recipe may therefore be utilized to effectuate a set of rules for building and configuring the software component.

Accordingly, the software image recipes provide instructions for building software images defined with respect to code units in the form of software packages, where combinations of software packages may be used to realize different software images. In this regard, the packages may act as building blocks for software images, with the software image recipes providing the directions for combining these building blocks in order to assemble the code of a software image. That is, the packages may be adapted to perform discrete functions or sets of functions which might be utilized by different software images such that a given package may be used to provide its respective functions to different software images whose software image recipes indicate that the package is to be used for building their corresponding software images.

By defining packages as units of code with respect to certain functions or combinations of functions, the packages as defined in the software image recipes may be flexibly combined for different types of software images. That is, any given package may be used as part of the recipe for different types of software images such as, but not limited to, a software container image and a virtual machine image. By defining software image recipes with respect to different sets of functions, and further by separating portions of code which perform certain functions within a given software component from portions of code used to run the software component (such as the kernel, operating system, and applications used to realize a virtual machine), the packages may be utilized to build different types of software images.

FIG. 1 shows an example network diagram 100 utilized to describe the various disclosed embodiments. In the example network diagram 100, computing environments 110 through 130 communicate with each other and with a user device 140 in order to realize various software image management techniques discussed herein. Any or all of such communications may be realized via one or more networks (not shown). Such a network may be, but is not limited to, a wireless, cellular or wired network, a local area network (LAN), a wide area network (WAN), a metro area network (MAN), the Internet, the worldwide web (WWW), similar networks, and any combination thereof.

As depicted in FIG. 1, the computing environment 110 is a computing environment in which an image manager 111 is deployed or otherwise realized. The image manager 111 may be realized as or via a server (not separately depicted). An example schematic diagram which may be utilized to realize such a server is discussed further below with respect to FIG. 8.

The image manager 111 is configured to manage software images used in one or more computing environments such as, but not limited to, the computing environment 120. More specifically, the image manager 111 is configured to build software images using software image recipes as described herein. As noted herein, such software image recipes may be, may include, or may otherwise be realized as a file including a set of instructions for building and configuring a software component such as a software container or virtual machine according to a predetermined definition of the software component. Such a recipe may be defined with respect to a set of packages as well as configuration data for configuring a software component containing these packages. The packages, in turn, are packages of code which may include code stored in one or more code repositories such as, but not limited to, the code repositories 131.

The software images created using the recipes may be stored in an image repository 112 for subsequent use. The recipes, along with other data used to build the software images (for example, code retrieved from the code repositories 131, packages created using such code, and the like), may be stored in a database 113.

In accordance with various disclosed embodiments, the image manager 111 may be configured to utilize artificial intelligence (AI) in order to generate software image recipes to be used for software image management. To this end, the image manager 111 may communicate (as shown) or include (not shown) a recipe creation model 114. In an embodiment, the recipe creation model 114 is a language model or other generative AI (genAI) model configured to generate textual outputs. Such a language model is a machine learning model such as, but not limited to, a large language model (LLM). A language model is configured to output text based on inputs such as or including text.

In accordance with various embodiments described herein, the recipe creation model 114 is prompted using a text prompt describing an application for which a software image recipe is to be generated. The recipe creation model 114 may output text describing the packages to be used for building the corresponding software image for each created recipe, and such output text may be used to create the file of the software image recipe. That file may be stored, for example, in the database 113 after being populated with the text output by the recipe creation model 114. Text to be used as part of or otherwise to generate such prompts may be received, for example, from the user device 140.

To aid in generating software image recipes, the recipe creation model 114 may be provided access to one or more tools (not shown) to be used for accessing data such as, but not limited to, data stored in the code repositories 131. Such tools may therefore allow the recipe creation model 114 to access code of applications for analysis and use in generating software image recipes. That is, the code may be utilized by the recipe creation model 114 in order to determine features of the applications which need to be realized via the corresponding software image recipes.

It should be noted that the recipe creation model 114 is depicted as being deployed within the computing environment 110 for example purposes, but that the recipe creation model 114 may be deployed outside of the computing environment 110 without departing from the scope of the disclosure. For example, the recipe creation model 114 may be deployed in or otherwise accessible to an external server (not shown) such as, but not limited to, a server of a third party AI service provider.

The computing environment 120 may be a client computing environment in which one or more servers 122 acting as clients for the image manager 111, the image repository 112, or both. To this end, the computing environment 120 includes one or more servers 122 running code used to realize software applications or otherwise to run code and, more specifically, to run code of software components including code among software images as discussed herein. To this end, the computing environment 120 may further include an image repository 121 utilized to store software images built by the image manager 111.

The computing environment 120 may further include one or more cybersecurity tools 123. Such cybersecurity tools 123 may be configured to monitor for potential cyber threats, to alert on potential cyber threats, to mitigate or remediate potential cyber threats, a combination thereof, and the like. In particular, in accordance with various disclosed embodiments, the cybersecurity tools 123 may be configured to alert on potential cyber threats and to include data indicating potentially vulnerable software images or portions thereof (e.g., packages), which in turn may be utilized to determine which software images may require rebuilding or redeployment (e.g., redeployment of the corresponding software component) as described herein. To this end, such alerts may be sent from the cybersecurity tools 123 to the servers 122, to the image manager 111, or both.

The computing environments 130-1 through 130-n (where n is an integer having a value greater than or equal to 1, also referred to as a computing environment 130 or as computing environments 130 for simplicity) may each include one or more code repositories 131. Such code repositories 131 may store code and, in particular, code released by developers or other entities that provide code intended to be packaged with other code to create code packages. Such code may be updated, for example, in new code releases, in order to patch vulnerabilities or otherwise improve the code. Code stored in the code repositories 131 may be downloaded (e.g., by the image manager 111) and utilized to build software images as discussed herein.

The user device 140 may be, but is not limited to, a personal computer, a laptop, a tablet computer, a smartphone, a wearable computing device, or any other device capable of receiving and displaying notifications. The user device 140 may be owned, operated, or otherwise used by a person or entity which may manage code deployed in the computing environment 120. As a non-limiting example, the user device 140 may be operated by a developer who manages code at least some of the software components deployed in the computing environment 120. The user device 140 may receive notifications (e.g., from the image manager 111) indicating that certain software images have been built or rebuilt and stored in the image repository 112. The user device 140 may be used to cause the servers 122 to download such software images for software component deployment (e.g., to download such software images and either store those in local storages of the servers 122, in the image repository 121, or both).

It should be noted that FIG. 1 depicts an implementation of various disclosed embodiments, but that at least some disclosed embodiments are not necessarily limited as such. Other deployments, arrangements, combinations, and the like, may be equally utilized without departing from the scope of the disclosure. For example, the image manager 111 may be deployed or otherwise realized in the computing environment 120 used to host the servers 122 on which software components are deployed without departing from the scope of at least some disclosed embodiments. Generally speaking, in at least some embodiments, any of the computing environments 110 through 130 may be combined at least partially (e.g., combining entities from different computing environments), or may be further separated into more computing environments (not shown), without departing from the scope of the disclosure.

Figure 2:
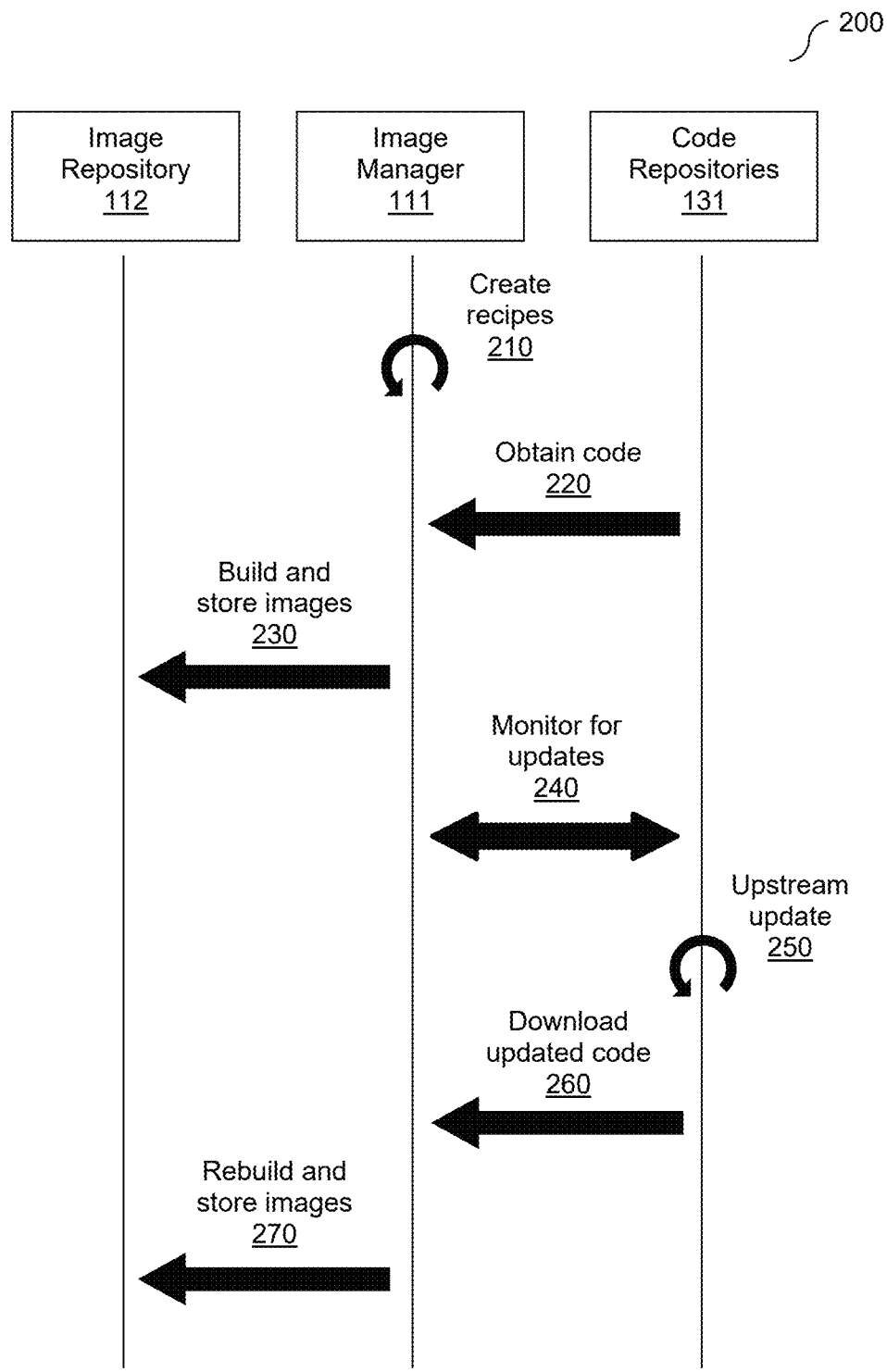
FIG. 2 is a flow diagram illustrating building and maintaining an image repository in accordance with various disclosed embodiments.

FIG. 2 is a flow diagram 200 illustrating building and maintaining an image repository in accordance with various disclosed embodiments. FIG. 2 depicts communications between and among the image repository 112, the image manager 111, and the code repositories 131, FIG. 1.

As depicted in FIG. 2, at 210, the image manager 111 creates one or more software image recipes to be utilized for building software images in order to populate the image repository 112. Such recipes may be created using AI and, more specifically, using genAI, as discussed herein. To this end, in some embodiments, 210 further includes receiving inputs (not shown) such as natural language text and prompting a genAI model such as a LLM. Also discussed herein, such a genAI model may be provided access to application programming interfaces (APIs) or other tools used to allow the genAI model to access code to be used for software image recipe generation. Each recipe is a file including code defining packages to be combined in order to build a corresponding software image.

At 220, the image manager 111 obtains code from one or more of the code repositories 131. As discussed herein, such code includes code used to create packages or otherwise to build software images. The obtained code may be obtained as packages, or may be obtained as other discrete portions of code to be used for creating packages. When the software images are virtual machine images or other software images which utilize additional code or to run, the obtained code may further include such additional code (e.g., code of kernels and operating systems used to realize virtual machines).

At 230, the image manager 111 builds one or more software images and stores the built software images in the image repository 112. More specifically, as described herein, the image manager 111 builds the software images using software image recipes (e.g., the recipes identified at 210). That is, the image manager 111 builds the software images by combining packages and configuring the software images according to their corresponding recipes. When the software images are virtual machine images or other software images which utilize additional code to run, the software images may be built to include such code.

Once the image repository 112 has been populated with images built using the recipes, the image repository 112 may be updated as code used by those images are updated. To this end, in some embodiments, at 240, the image manager 111 monitors for updates to code in the code repositories 131 in order to identify updates to code (e.g., code releases) for code used by software images.

More specifically, as described herein, the image manager 111 may be configured to monitor for updates with respect to upstream code (e.g., as determined based on code dependencies of code in software images). When an upstream update occurs in one of the code repositories at 250, the image manager 111 may download the updated code at 260. The updated code, in turn, may be utilized to rebuild and store one or more of the software images at 270 (e.g., software images including older versions of the updated code may be rebuilt with the updated code).

It should be noted that FIG. 2 depicts a flow including both building and rebuilding images, but these processes may be realized as separate flows without departing from the scope of the disclosure. Additionally, in some embodiments, updated code may only be downloaded, images may only be rebuilt, or both, when certain conditions are met. As a non-limiting example, code may only be automatically downloaded and used to rebuild images when the code contains a vulnerability patch or other cybersecurity-relevant updates. In such embodiments, code may be manually downloaded and used to rebuild images at the direction of an operator (e.g., a user of the user device 140, FIG. 1) when inputs indicating certain portions of code to download, certain software images to check for potential code updates, or both, are received.

Figure 3:
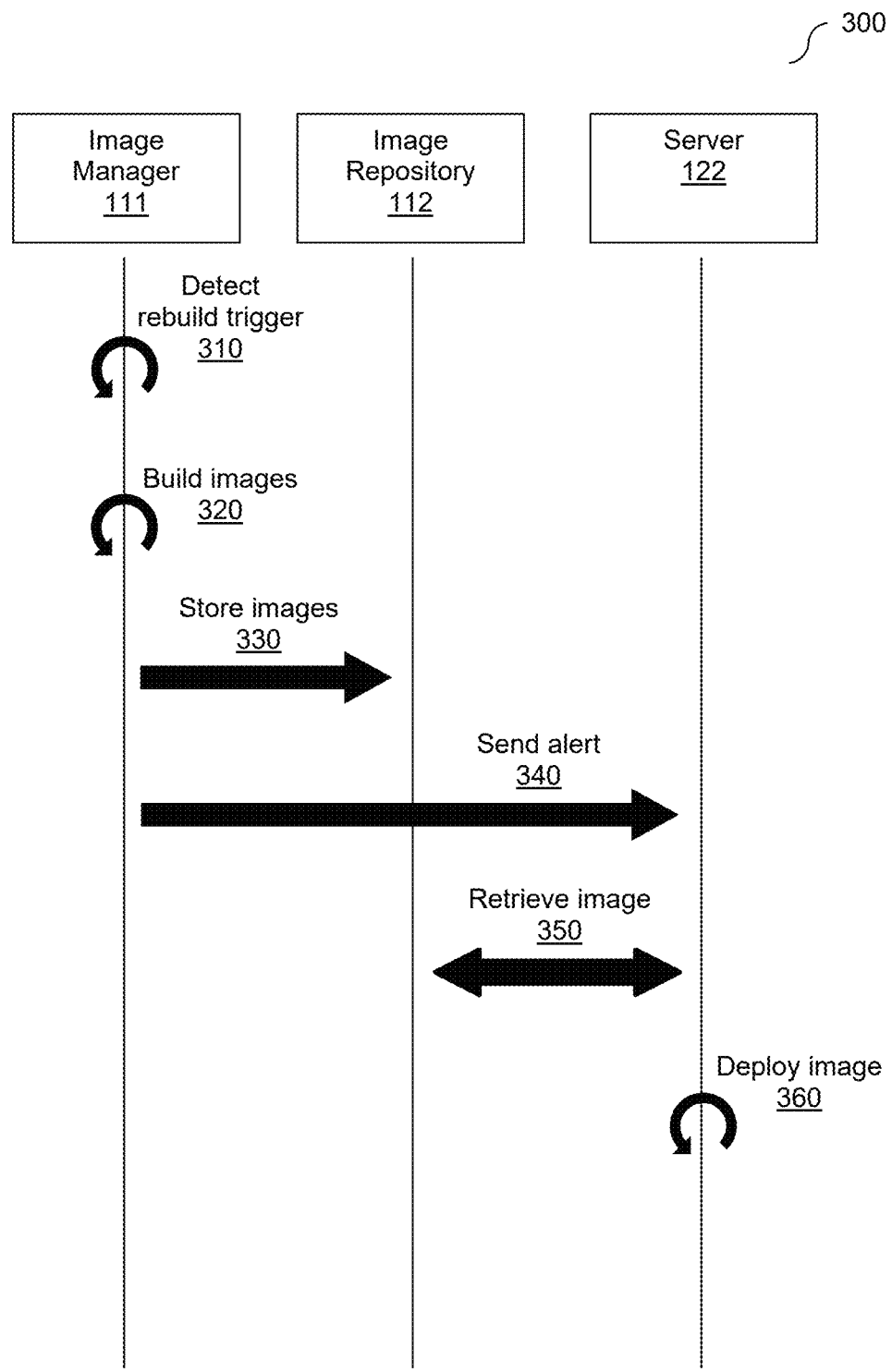
FIG. 3 is a flow diagram illustrating providing a new image for deployment in accordance with various disclosed embodiments.

FIG. 3 is a flow diagram 300 illustrating providing a new image for deployment in accordance with various disclosed embodiments. FIG. 3 depicts communications between and among the image repository 112, the image manager 111, and the server 122, FIG. 1.

As depicted in FIG. 3, optionally at 310, a rebuild trigger is detected. Such a rebuild trigger may be an update to code used by a software image, or may be such an update which meets certain criteria (e.g., includes vulnerability patches or other cybersecurity-related updates).

At 320, software images are built or rebuilt by the image manager 111. When images are rebuilt, updated code for those images may be downloaded and used for rebuilding. At 330, the newly built or rebuilt images are stored in the image repository 112.

At 340, the image manager 111 may generate and send an alert to one of the servers 122. The alert may indicate, for example, that a given software image has been rebuilt and is available for download, whether the software image includes a cybersecurity update (e.g., includes code with a vulnerability patch), both, and the like.

When the server 122 has received the alert, the server 122 may retrieve an image from the image repository 112 at 350 and deploy the retrieved image (e.g., by running the image in order to deploy the corresponding software component for the image).

It should be noted that FIG. 3 depicts the server 122 retrieving an image directly from the image repository 112 in accordance with at least some embodiments, but that the image may be obtained by the server 122 in other ways in at least some embodiments. For example, in some embodiments, the image manager 111 may transmit the image to the server 122 at 340 in addition to or instead of sending the alert.

Figure 4:
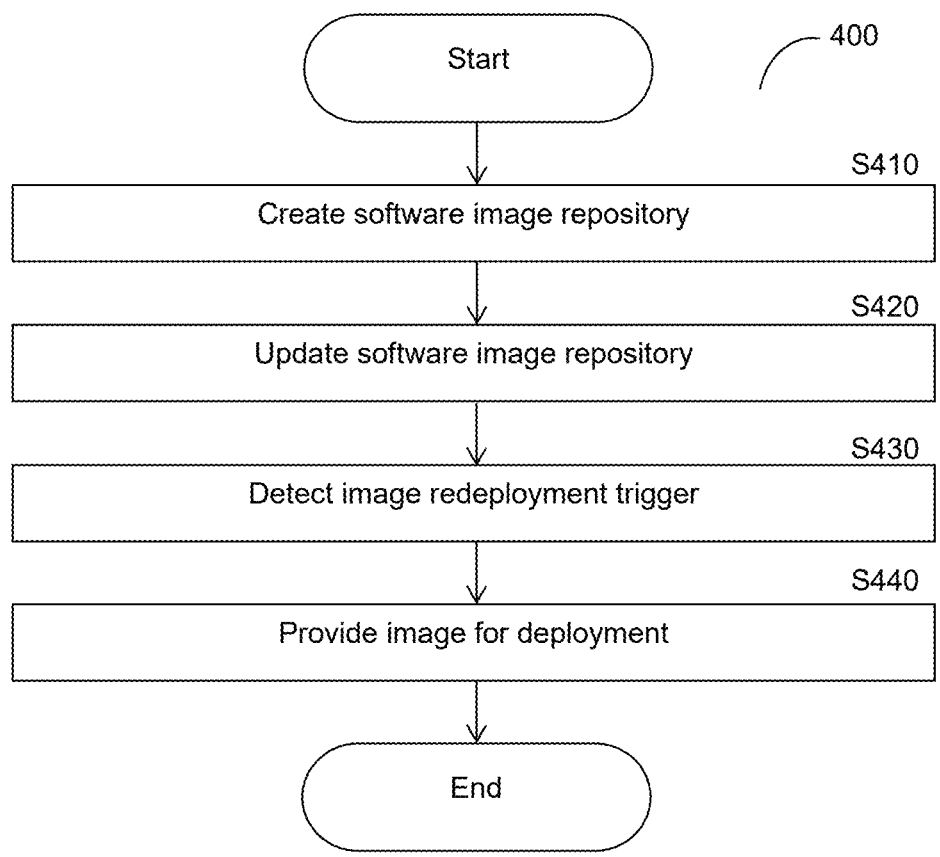
FIG. 4 is a flowchart illustrating a method for software image update management according to an embodiment.

FIG. 4 is a flowchart 400 illustrating a method for software image update management according to an embodiment. In an embodiment, the method is performed by the image manager 111, FIG. 1.

At S410, a software image repository is created. In an embodiment, creating the software image repository includes building one or more software images according to respective software image recipes and storing the built images in the software image repository.

As discussed herein, such a software image recipe may be or may include a file having executable code utilized to realize a given software component such as, but not limited to, a software container, a virtual machine, and the like. To this end, each software image recipe may be realized as a file including a set of instructions for building and configuring a software component such as a software container or virtual machine according to a predetermined definition of the software component. The set of instructions of each software image recipe may therefore be utilized to effectuate a set of rules for building and configuring the software component.

More specifically, the set of instructions of each software image recipe defines a corresponding software image with respect to a combination of packages such that the software image built using a given software image recipe includes each package among the combination of packages of the software image recipe. To this end, the set of instructions of each software image includes a description of each package to be used for building the software image and a description of how to obtain a latest version or release of the code of each package. The description of each package may be or may include an identifier (e.g., a name or identification number) of each portion of code used to create the package, a location (e.g., a location within a repository or otherwise a location in storage) of the package or of the code used to create the package, both, and the like. The description of how to obtain the latest version or release of the code of each package may be or may include an indication of a location where each portion of code for each package is stored (e.g., in one or more code repositories).

Each software image built using a corresponding software image recipe includes all of the code utilized to run a given software component, and may further include libraries, binaries, settings, and other data used to realize the corresponding software component. When a software image is for a virtual machine, the software image may further include an operating system, applications, and other data used to realize a virtual machine. The corresponding software image recipe for a given software image may therefore identify such code and other data (e.g., by location in storage, by identifier, by a combination thereof, and the like) such that a software image may be built at least by combining packages identified in the corresponding software image recipe.

In accordance with various disclosed embodiments, some or all of the software images may be built using software image recipes created via AI. To this end, creating the software image recipe may include prompting a recipe creation model based on user inputs or other inputs indicating applications for which software image recipes are to be generated, and generating the file of each software image recipe using the outputs of the recipe creation model.

An example process for creating a software image repository is described further below with respect to FIG. 5.

At optional S420, the software image repository may be updated. As a non-limiting example, as new code releases are made available such that code used by software images becomes updated, some or all of those software images may be updated accordingly by downloading new code, packaging the new code into new packages, and combining the new packages according to the corresponding software image recipes for software images. To this end, in an embodiment, updating the software image repository includes rebuilding one or more of the software images stored in the software image repository. An example process for updating the software image repository is described further below with respect to FIG. 6.

At optional S430, a software image redeployment trigger may be detected. The redeployment trigger may be defined such that software images are only redeployed when certain criteria are met. To this end, in an embodiment, detecting the software image redeployment trigger includes applying one or more redeployment trigger detection rules defined with respect to such criteria. In some embodiments, the redeployment trigger detection rules may be defined such that the trigger is detected when a vulnerability in a software image is being exploited.

In some embodiments, the redeployment trigger may be defined with respect to cybersecurity threats such that a software image is redeployed when a cyber threat or potential cyber threat is detected, when a vulnerability is identified, and the like. In a further embodiment, a redeployment trigger is detected when a vulnerability in one or more software components deployed using one or more of the software images is actively being exploited.

At S440, the software image is provided for deployment. In an embodiment, providing the software image includes storing the software image in a repository (e.g., the image repository 112 or the image repository 121, FIG. 1). The software image may be retrieved by one or more servers (e.g., the servers 122, FIG. 1) from the repository, either directly or by sending a request to a system having access to the repository (e.g., the image manager 111, FIG. 1).

In some implementations, the software image may be provided to an air-gapped device which is not connected to any networks. In an embodiment, to support such implementations, providing the software for deployment may include, but is not limited to, storing the software image in a repository which is accessible to a system from which the software image may be loaded onto an external storage (e.g., a Flash drive), which in turn may be connected to the air-gapped device in order to deliver the software images stored on the external storage to the air-gapped device.

When the software image has been stored in such a repository, the external storage may be connected to a system, and the system may be utilized to download or otherwise retrieve the software image from the repository. The system may further be used to load the software image onto the external storage, and the external storage may be moved to a physical location of the air-gapped device in order to allow for connecting the external storage to the air-gapped device. When the external storage is connected to the air-gapped device, the software image may be copied or transferred to the air-gapped device.

Figure 5:
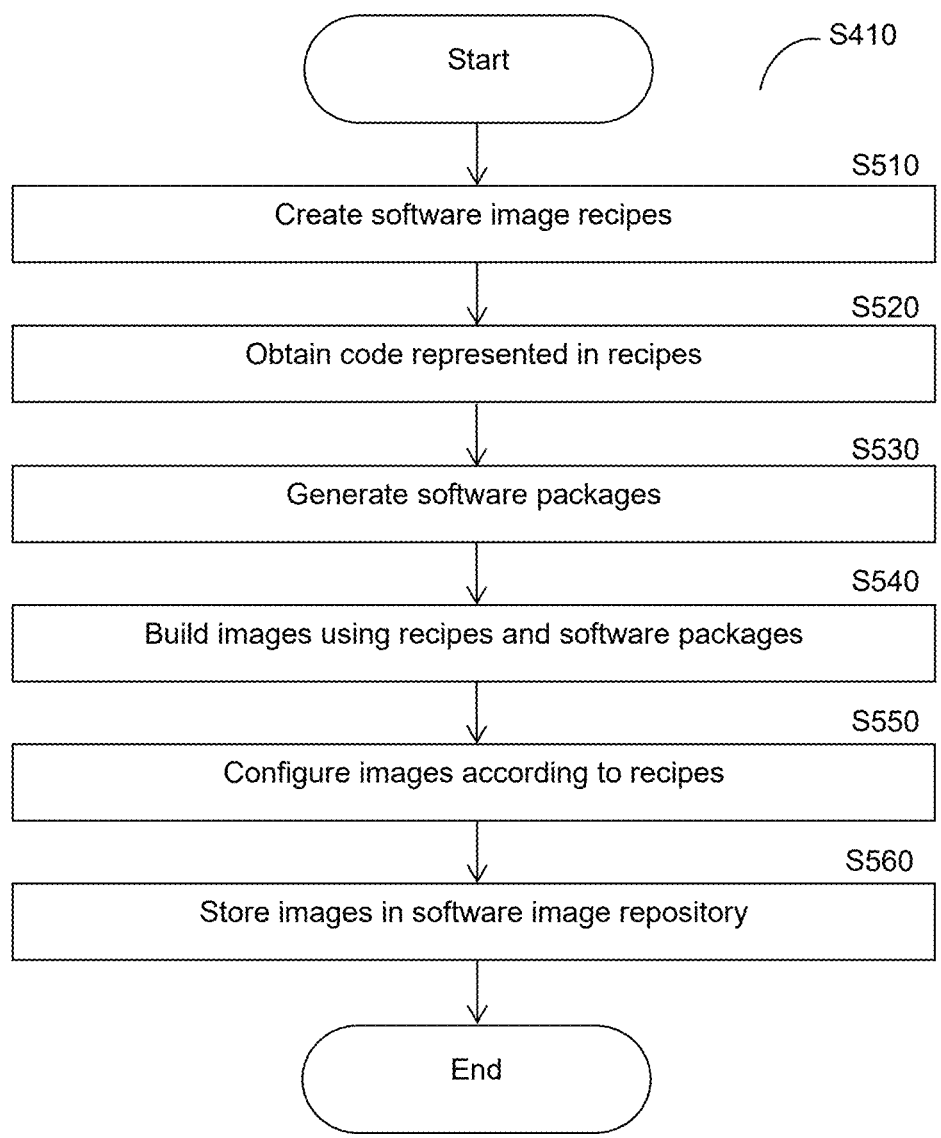
FIG. 5 is a flowchart illustrating a method for creating a software image repository according to an embodiment.

FIG. 5 is a flowchart S410 illustrating a method for creating a software image repository according to an embodiment.

At S510, software image recipes to be used for creating software images are created. In accordance with various disclosed embodiments, the software image recipes are created by generating text using one or more artificial intelligence (AI) models such as, but not limited to, one or more generative AI (genAI) models like large language models (LLMs). An example process for recipe creation using AI is described further below with respect to FIG. 6.

As noted herein, each software image recipe may be or may include a file having executable code utilized to realize a given software component such as, but not limited to, a software container, a virtual machine, and the like. To this end, in an embodiment, each software image recipe is realized as a file including a set of instructions for building and configuring a software component such as a software container or virtual machine according to a predetermined definition of the software component. The set of instructions of each software image recipe may therefore be utilized to effectuate a set of rules for building and configuring the software component. The set of instructions may include or otherwise be generated based on text output by the AI models used for software image recipe creation as discussed herein.

In a further embodiment, the set of instructions of each software image recipe defines a corresponding software image with respect to a combination of packages such that the software image built using a given software image recipe includes each package among the combination of packages of the software image recipe. To this end, the set of instructions of each software image includes a description of each package to be used for building the software image and a description of how to obtain a latest version or release of the code of each package as discussed above, for example with respect to FIG. 4. In yet a further embodiment, the set of instructions for each software image recipe further defines a configuration for the corresponding software image, and the software image built using a corresponding software image recipe is configured in order to match the configuration defined in the corresponding software image recipe.

At S520, code of software packages (also referred to as packages) represented in the identified software image recipes is obtained. Such code may be, for example but not limited to, retrieved from one or more code repositories (e.g., one or more of the code repositories 131, FIG. 1). The code may include, but is not limited to, binaries or other code to be included in respective packages. In an embodiment, S520 may further include obtaining any associated files (e.g., files associated with respective binaries containing libraries or other resources to be used by those binaries).

In an embodiment, the code may be included in package definitions of packages which define portions of code to be utilized for creating each package. Such package definitions may identify code with respect to identifier, location (e.g., location in storage), and the like. In such an embodiment, the code may therefore be obtained based on such package definitions, for example by obtaining code having certain identifiers or locations in storage.

At S530, software packages (also referred to as packages) are generated using the obtained code. In an embodiment, the packages may be generated using package generation rules which define how each package is to incorporate each portion of code included therein. More specifically, the package generation rules may define templates or other predetermined portions of packages into which portions of code are to be inserted or otherwise which are to be combined with portions of code.

In some embodiments, any or all of the obtained code may be retrieved in a pre-packaged format (e.g., already organized into software packages). In such embodiments, any such pre-packaged software packages may be utilized to build software images during subsequent processing.

At S540, software images are built using their corresponding software image recipes and the packages generated at S530, any pre-packed software packages, or both. That is, each software image is built using its corresponding software image recipe by at least combining packages according to the software image recipe. More specifically, for each recipe, a subset of the packages generated at S530 or otherwise a subset of a set of packages is combined in order to build the corresponding software image for the recipe.

At S550, the software images are configured according to their corresponding software image recipes. As noted above, each software image recipe may include configuration instructions or otherwise provide configuration data indicating how the software image is to be configured.

At S560, the built software images are stored in one or more software image repositories (e.g., the repository 112, FIG. 1) for subsequent use or access.

Figure 6:
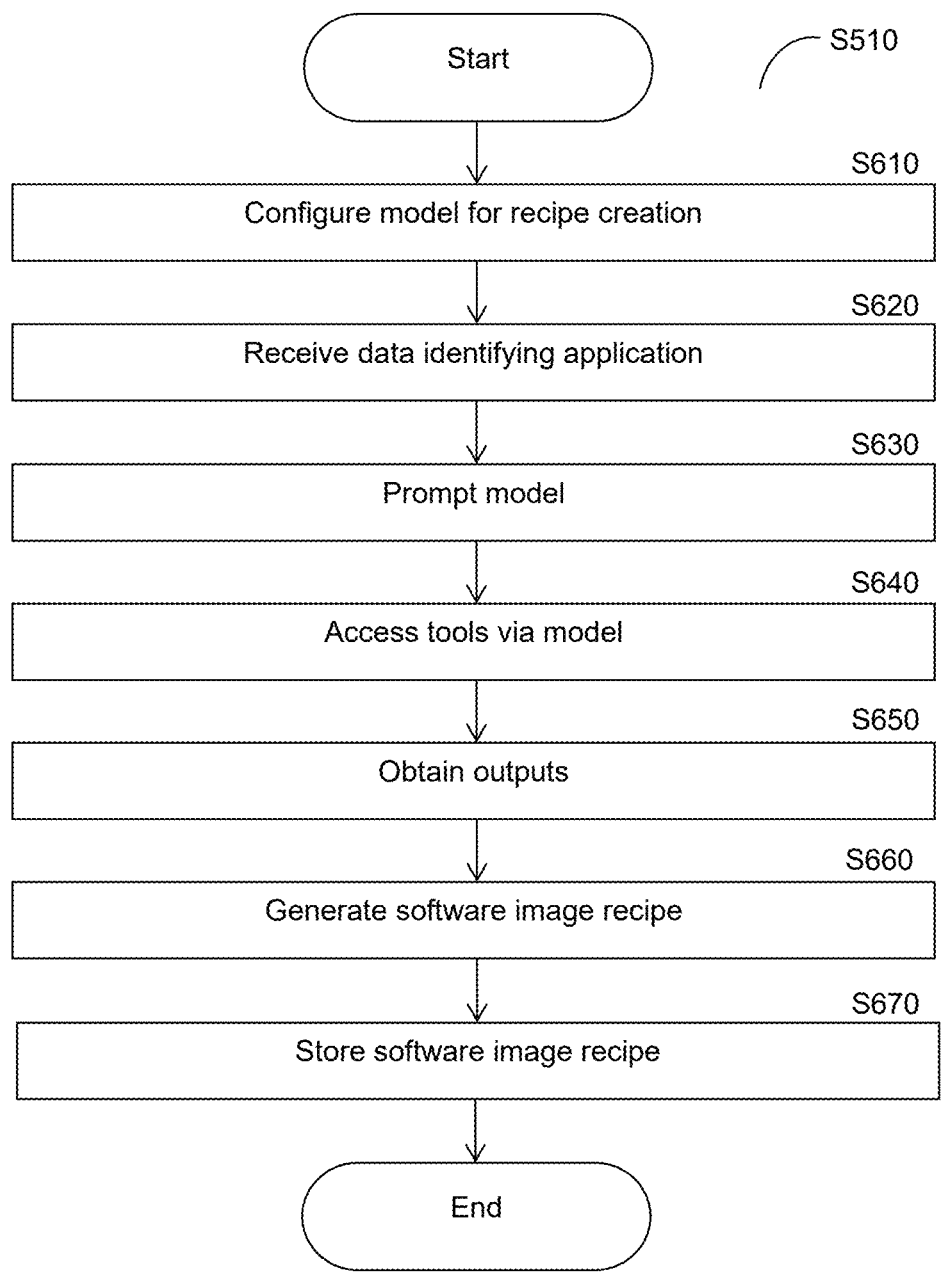
FIG. 6 is a flowchart illustrating a method for creating recipes using artificial intelligence according to an embodiment.

FIG. 6 is a flowchart illustrating a method S510 for creating recipes using artificial intelligence according to an embodiment. In an embodiment, the method is performed by the image manager 111, FIG. 1.

At S610, a model is configured for recipe creation. In an embodiment, the model is or includes a machine learning model such as, but not limited to, a language model or generative artificial intelligence model. Such a language model is configured to generate text in natural language based on inputs such as text. As a non-limiting example, the model may be a large language model (LLM).

In an embodiment the model is configured in order to enable the model to create software image recipes as discussed herein. In a further embodiment, the model is configured in order to process textual inputs identifying an application for which a software image recipe is to be created, and the model is further configured to output data to be used as the software image recipe or otherwise to be used for creating the software image recipe (for example, text to be included in the software image recipe or a file including such text).

As noted above, in accordance with various disclosed embodiments, each software image recipe includes a set of instructions which define a corresponding software image with respect to a combination of software packages such that the software image built using a given software image recipe includes each package among the combination of software packages of the software image recipe. To this end, in a further embodiment, the set of instructions of each software image includes a description of each software package to be used for building the software image and a description of how to obtain a latest version or release of the code of each such package. The model may be configured as described herein in order to allow the model to generate text which may be used to create software image recipes including such sets of instructions, descriptions of packages, or both.

The description of each software package may be or may include an identifier (e.g., a name or identification number) of each portion of code used to create the package. The description of how to obtain the latest version or release of the code of each package may be or may include an indication of a location where each portion of code for each package is stored (e.g., in one or more code repositories).

In an embodiment, configuring the model includes providing the model with access to one or more tools (for example, database application programming interfaces [APIs] or other tools used to access databases such as code repositories) in order to allow the model to retrieve data to be used for recipe creation. Such data to be used for recipe creation may be, but is not limited to, code, metadata associated with code (for example, metadata describing use or purpose of the code), combinations thereof, and the like. In an embodiment, at least some of the data used by the model for recipe creation includes data of an application indicating functions or other properties of the application, and the model is configured to generate text indicating packages and instructions for assembling packages that can be used to build software images having these properties of the application.

In some embodiments, configuring the model includes training the model using a training set including example historical application identifiers or other historical data related to applications which act as training application data during training. In a further embodiment, the training set includes labels corresponding to respective portions of the training application data. The labels may be or may include resulting software image recipes for applications having the corresponding portions of training application data. That is, the training may be performed using supervised learning in which the model is trained using a set of training inputs and a set of labels corresponding to respective training outputs for those training inputs. The training inputs may be or may include textual descriptions of applications for which software image recipes were created, and the training outputs may be text or files (for example, files including text) of the corresponding software image recipes created based on those application descriptions.

As discussed further below, the prompts input to the model may include predetermined portions of text, for example, portions of text describing the activities to be performed by the model (such as instructing the model to generate a software image recipe) or providing additional data to be used by the model when generating software image recipes. To this end, in such embodiments, the training application-identifying data used to train the model may be or may include sets of application-identifying data including such predetermined portions of text. Training the model using the predetermined portions of text used for subsequent prompts to the model may allow for improving the accuracy of the model outputs.

An example process for configuring the model is described further below with respect to FIG. 7.

At S620, application-identifying data which identifies an application for which a software image recipe is to be created are received. The application-identifying data may be or may include textual inputs describing the application, indicating a location of data describing the application, identifying the application using metadata (for example, a file name), a combination thereof, and the like. The application-identifying data may be used as text inputs to the model, may be used to retrieve such text (for example, by accessing data related to the application including such text via one or more tools), or a combination thereof.

At S630, the model is prompted based on the application-identifying data. In an embodiment, S630 includes generating a prompt based on the application-identifying data. The prompt may be generated based further on one or more predetermined portions of text, for example, text describing a query for a software image recipe which may act as a template into which certain application-identifying data is to be inserted. As a non-limiting example, such a predetermined portion of text may be "Create a software image recipe for the application located at" or "Create a software image with the following properties."

The model may be run locally on the system performing the method of FIG. 6. In some embodiments, the model may be run remotely, for example, via one or more servers communicating with the system performing the method of FIG. 6. When the model is run remotely, prompting the model may include sending data including the prompt to such a server or other system on which the model is run.

At S640, one or more tools may be accessed via the model. In an embodiment, S640 includes receiving one or more function calls or other instructions from the model and executing one or more actions in order to retrieve data or otherwise perform the called functions. As a non-limiting example, a function call to a code repository may ask to retrieve the code of an application and indicate the location of the application for which code is to be retrieved.

At S650, one or more outputs of the model are obtained. In some embodiments, S650 includes generating the outputs via the model. In other embodiments, S650 may include receiving outputs from the model (for example, from data sent by a server when the model is run remotely via the server). The outputs of the model may be or may include, but are not limited to, text of a software image recipe. In some embodiments, the outputs of the model may be or may include a file of the software image recipe containing such text. Accordingly, the outputs may be used as the software image recipe during subsequent processing, or may be utilized to generate the software image recipe as described with respect to S660.

At optional S660, a software image recipe is generated based on the outputs of the model. Specifically, the software image recipe may be generated such that the software image recipe includes text among the outputs of the model. In an embodiment, the software image recipe is a file including a set of instructions that, when executed by a processing circuitry, configures the processing circuitry to build a software image for an application corresponding to the software image recipe. To this end, in a further embodiment, the set of instructions indicates a set of packages to be used for building the software image. In yet a further embodiment, the set of instructions may further indicate a description of each package to be used for building the software image, a description of how to obtain a current or otherwise latest version or release of the code of each package, or both.

At S670, the software image recipe generated at S660 or obtained as an output at S650 is stored for subsequent use. The software image recipe may be stored in a repository and retrieved when a new instance of a software container or other software component is desired.

In some embodiments, the software image recipe may be retrieved in order to rebuild a software image, for example, when a vulnerability or other potential cyber threat is detected. When the packages describe the locations of packages to be used for building the software image, rebuilding the software image when a cyber threat is detected allows for effectively updating the software image in order to secure the computing environment against potential cyber threats in real-time.

Figure 7:
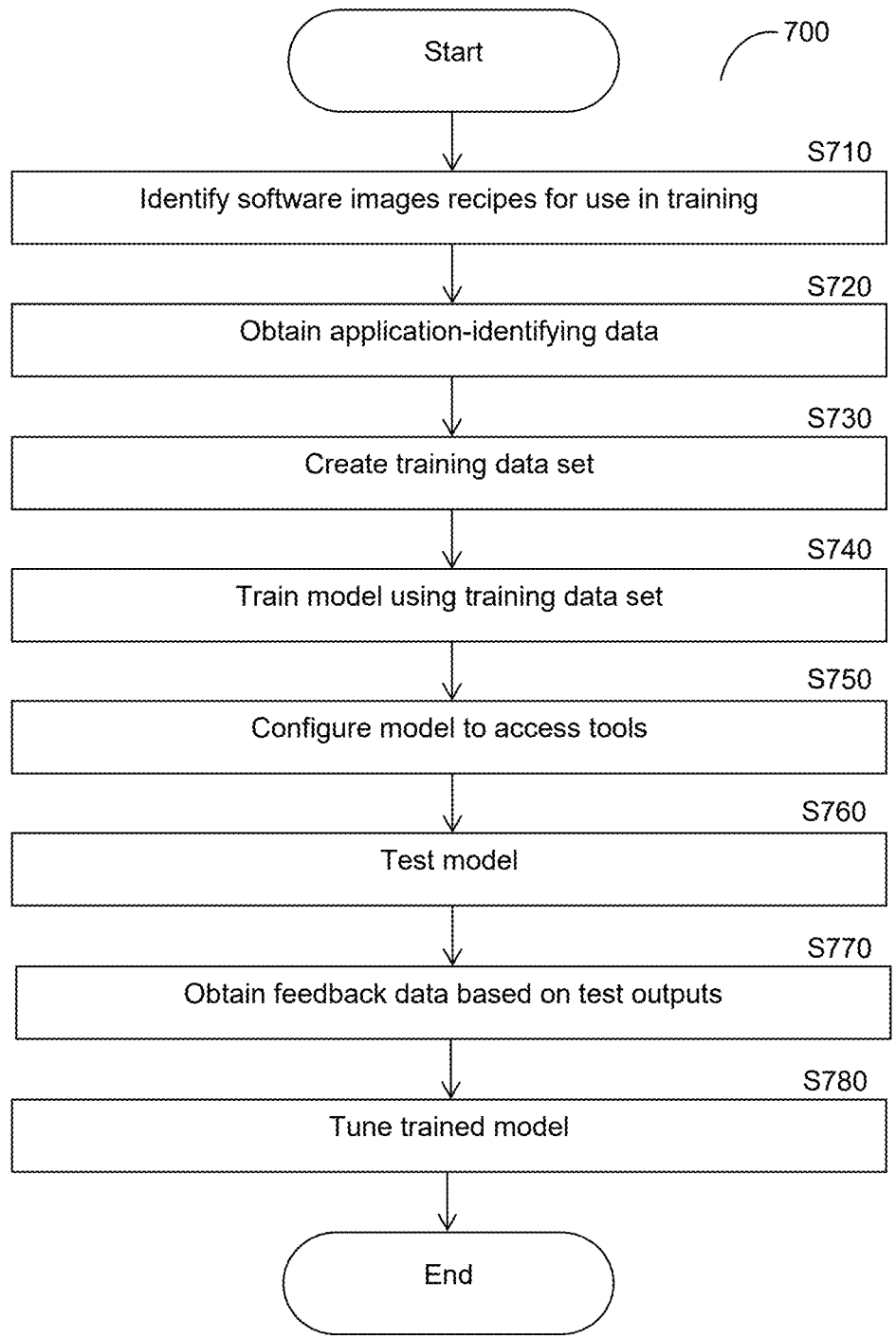
FIG. 7 is a flowchart illustrating a method for training an artificial intelligence model for recipe creation according to an embodiment.

FIG. 7 is a flowchart 700 illustrating a method for training an artificial intelligence model for recipe creation according to an embodiment. In an embodiment, the method is performed by the image manager 111, FIG. 1.

At optional S710, software image recipes to be used for training are identified. The software image recipes and, more specifically, text of the software image recipes, may be used to label portions of application-identifying data in order to create a labeled dataset for use in a supervised learning process.

At S720, application-identifying data is obtained. The application-identifying data includes data describing, indicating a location of, or otherwise identifying historical applications which might be built using software image recipes. The application-identifying data is used to train a model.

When the training is performed using a supervised machine learning process, the application-identifying data may include various portions of application-identifying data corresponding to respective software image recipes among the software image recipes identified at S710. That is, the portions of application-identifying data may identify respective applications, where each of those applications corresponds to one of the software image recipes (i.e., a software image recipe that causes building of the corresponding application when executed). The portion of application-identifying data for each application may be labeled with the text of the corresponding software image recipe acting as a corresponding training output label in order to produce a supervised training data set.

At S730, a training data set is created based on the application-identifying data and, optionally, the software image recipes. In an embodiment, the training data set includes training inputs in the form of natural language text identifying example applications having software images defined by corresponding software image recipes. Such application-identifying natural language text inputs may indicate aspects of the application such as, but not limited to, name of the application, path to the application (for example, a path within a certain code repository), both, and the like.

In a further embodiment, the training data set also includes training outputs in the form of files of software image recipes or text of software image recipes. The training outputs may act as labels and may be associated with respective portions of the application-identifying data. For example, a portion of application-identifying data identifying a given application may be labeled with the software image recipe corresponding to that application such that the software image recipe as a label represents a "correct" or otherwise appropriate output for a portion of application-identifying data which is similar to the labeled portion of application-identifying data.

At S740, the model is trained using the training data set. In an embodiment, the model is trained by applying a machine learning algorithm to features among the training data set (for example, features among the training inputs, training outputs, or both) in order to tune weights of the model (for example, weights corresponding to respective features). As noted above, in an embodiment, the resulting model is trained to output text of software image recipes based on inputs including application-identifying data (for example, text identifying or otherwise describing an application). In a further embodiment, the model is trained using a supervised machine learning process by applying a supervised machine learning algorithm to the labeled training inputs (i.e., the training inputs labeled with corresponding training outputs).

At S750, the model is configured to access one or more tools. The tools may be or may include, but are not limited to, application programming interfaces (APIs), functions, combinations thereof, portions thereof, and the like. Such an API may be an API used to communicate with a given service or application which may be utilized by the model in order to retrieve data or perform other actions for purposes of generating outputs. As a non-limiting example, the model may be configured with data used to access an API of a code repository such that the model is able to request and receive data of applications represented among application-identifying data from the code repository.

In some embodiments, configuring the model to access a tool includes prompting the model using a prompt including text describing functions calls for the tool to be used for calling functions of the tool. Such text describing function calls may be, but are not limited to, descriptions of functions which the tool is configured to execute (for example, a textual description of what each function does and when the function should be used), formats to be used for calls to different functions, both, and the like. These prompts may be predetermined prompts and may be or may include text such as, but not limited to, text of API documentation describing the functions available via code of an API. This data may therefore allow the model to generate text formatted according to the API documentation or other standardized format recognized by the tool. The model may call the functions of the tool using the function calls defined in the text in order to access data to be used for software image recipes such as, but not limited to, retrieving data from code repositories in order to identify code to be used for software packages.

At optional S760, the model may be tested. In an embodiment, testing the model includes applying the model to a set of application-identifying inputs in order to obtain a set of test outputs.

In some embodiments, the model may be tested using at least a portion of the application-identifying inputs used to train the model. In such an embodiment, testing the model may further include comparing the outputs of the model to training outputs among the training data set used to train the model. As a non-limiting example, a features distance or other distance may be determined between each output of the model and the training output corresponding to the application-identifying input processed in order to generate the output.

At optional S770, feedback data is obtained based on the set of test outputs. In an embodiment, obtaining the feedback data includes displaying the test outputs or sending the test outputs for display (for example, via a user interface of a user device) and obtaining user inputs indicating whether the test outputs are appropriate outputs for their corresponding test inputs (i.e., the corresponding portions of application-identifying data input to the model in order to obtain the test outputs).

At S780, the model is tuned. In an embodiment, tuning the model includes adjusting weights of the model in order to improve the model's performance. The model may be tuned based on the results of the testing, the feedback data, additional examples (for example, samples received later after an initial training of the model), a combination thereof, and the like. The tuning is utilized to improve the accuracy of the model outputs.

Figure 8:
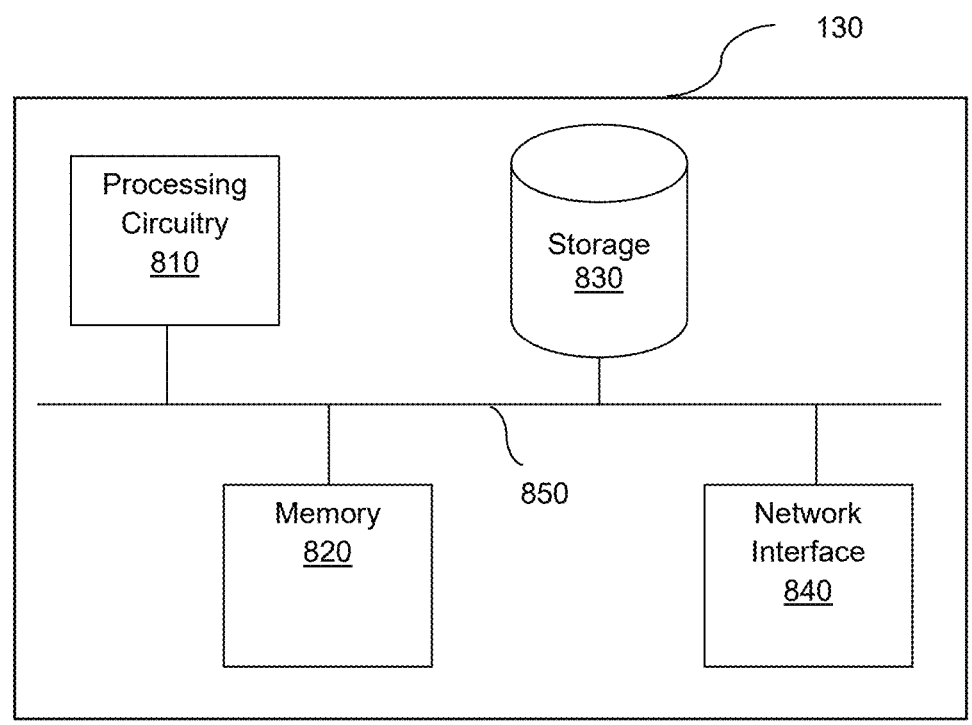
FIG. 8 is a schematic diagram of an image manager according to an embodiment.

FIG. 8 is an example schematic diagram of an image manager 111 according to an embodiment. The image manager 111 includes a processing circuitry 810 coupled to a memory 820, a storage 830, and a network interface 840. In an embodiment, the components of the image manager 111 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

In at least some embodiments, the processing circuitry 810 is configured to execute generative artificial intelligence (genAI) models, perform inference using or otherwise apply genAI models, train genAI models, fine-tune genAI models, combinations thereof, and the like. Such genAI models are configured to produce text, images, videos, or other forms of data, and may include, but are not limited to, language models (for example, but not limited to, large language models, small language models, etc.), text-to-image artificial intelligence (AI) image generation systems, text-to-video AI video generators, combinations thereof, and the like. To this end, the processing circuitry 810 may be adapted to realize a transformer deep learning architecture (e.g., a generative pre-trained transformer [GPT], bidirectional encoder representations from transformers [BERT], text-to-text transfer transformer [T5], etc.), a diffusion model, both, and the like.

In accordance with various such embodiments, the hardware utilized for the processing circuitry 810 is selected in order to enable genAI functionality based on factors such as, but not limited to, parallelism (e.g., amounts of parallel processing to be performed), memory demands (e.g., amounts of random access memory [RAM] utilized to store model weights and training during processing or video RAM [VRAM] to support large language models), clock speeds, thread counts, storage (for example, to support certain amounts of storage or storage speeds), cooling (e.g., liquid cooling or air cooling systems), power supply (e.g., in order to enable a target wattage used for certain kinds of activities), networking and connectivity (e.g., in order to support seamless data transfer for deployments involving communications between or among multiple machines or clusters), combinations thereof, and the like.

In embodiments which utilize large language models (LLMs) or otherwise perform operations which may require or be enhanced through use of parallel processing, the processing circuitry 810 may include one or more GPUs or other processing units suitable for parallel processing. Such GPUs may be configured to perform matrix multiplication operations including, but not limited to, performing dot product operations in order to support neural network operations (for example, by performing dot product operations for hidden layer computations) or performing dot product operations in an attention mechanism in order to compute a similarity score between vectors for use in computing attention weights. In at least some such embodiments using GPUs, the processing circuitry 810 may include a number of CPU cores which is equal to or greater than the number of GPUs in order to facilitate or otherwise support parallel processing via multiple GPUs.

The memory 820 may be volatile (e.g., random access memory, etc.), non-volatile (e.g., read only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 840 allows the image manager 111 to communicate with other systems, devices, components, applications, or other hardware or software components, for example as described herein.

It should be understood that the embodiments described herein are not limited to the specific architecture illustrated in FIG. 8, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for building software images, comprising:
   generating a prompt based on an input portion of application-identifying data;
   prompting a generative artificial intelligence model using the prompt in order to output text indicating a plurality of software packages, wherein each software package is a set of code for performing a plurality of functions of an application;
   generating a software image recipe based on the output text, wherein the software image recipe is a file including a set of instructions that cause a processing circuitry to build the software image by combining the plurality of software packages when executed; and
   building the software image by executing the software image recipe via the processing circuitry, wherein the software image causes deployment of a software component when executed, wherein the software component is configured to perform the plurality of functions of the application.

2. The method of claim 1, wherein the set of instructions further indicates a location of the set of code of each software package.

3. The method of claim 1, further comprising:
   providing the generative artificial intelligence model access to a tool having at least one function, wherein the generative artificial intelligence model calls the at least one function of the tool in order to obtain data of the application, wherein the output text is generated by the generative artificial intelligence model based on the data of the application obtained by calling the at least one function of the tool.

4. The method of claim 3, wherein providing the generative artificial intelligence model access to the tool further comprises:
   prompting the generative artificial intelligence model using text defining at least one function call for the tool, wherein the generative artificial intelligence model calls the at least one function of the tool using the at least one function call in order to obtain the data of the application.

5. The method of claim 1, wherein each software package includes code of a subset of the plurality of functions of the application.

6. The method of claim 1, wherein the generative artificial intelligence model is a language model.

7. The method of claim 1, further comprising:
   training the generative artificial intelligence model using a supervised machine learning process based on a labeled training data set including training inputs and corresponding training outputs, wherein the training inputs include a plurality of portions of training application-identifying data, wherein the training outputs include a plurality of corresponding labels representing respective software image recipe text outputs for the training inputs.

8. The method of claim 1, further comprising:
   deploying the software component by executing the software image.

9. The method of claim 8, further comprising:
   redeploying the software component when a cyber threat is detected with respect to the software component, wherein redeploying the software component further comprises rebuilding the software image using an updated version of at least one software package of the plurality of software packages.

10. A non-transitory computer readable medium having stored thereon instructions for causing a processing circuitry to execute a process, the process comprising:
    generating a prompt based on an input portion of application-identifying data;
    prompting a generative artificial intelligence model using the prompt in order to output text indicating a plurality of software packages, wherein each software package is a set of code for performing a plurality of functions of an application;

generating a software image recipe based on the output text, wherein the software image recipe is a file including a set of instructions that cause a processing circuitry to build the software image by combining the plurality of software packages when executed; and building the software image by executing the software image recipe via the processing circuitry, wherein the software image causes deployment of a software component when executed, wherein the software component is configured to perform the plurality of functions of the application.

11. A system for building software images, comprising:
a processing circuitry; and
a memory, the memory containing instructions that, when executed by the processing circuitry, configure the system to:

generate a prompt based on an input portion of application-identifying data;

prompt a generative artificial intelligence model using the prompt in order to output text indicating a plurality of software packages, wherein each software package is a set of code for performing a plurality of functions of an application;

generate a software image recipe based on the output text, wherein the software image recipe is a file including a set of instructions that cause a processing circuitry to build the software image by combining the plurality of software packages when executed; and build the software image by executing the software image recipe via the processing circuitry, wherein the software image causes deployment of a software component when executed, wherein the software component is configured to perform the plurality of functions of the application.

12. The system of claim 11, wherein the set of instructions further indicates a location of the set of code of each software package.

13. The system of claim 11, wherein the system is further configured to:

provide the generative artificial intelligence model access to a tool having at least one function, wherein the generative artificial intelligence model calls the at least one function of the tool in order to obtain data of the application, wherein the output text is generated by the generative artificial intelligence model based on the data of the application obtained by calling the at least one function of the tool.

14. The system of claim 13, wherein the system is further configured to:

prompt the generative artificial intelligence model using text defining at least one function call for the tool, wherein the generative artificial intelligence model calls the at least one function of the tool using the at least one function call in order to obtain the data of the application.

15. The system of claim 11, wherein each software package includes code of a subset of the plurality of functions of the application.

16. The system of claim 11, wherein the generative artificial intelligence model is a language model.

17. The system of claim 11, wherein the system is further configured to:

train the generative artificial intelligence model using a supervised machine learning process based on a labeled training data set including training inputs and corresponding training outputs, wherein the training inputs include a plurality of portions of training application-identifying data, wherein the training outputs include a plurality of corresponding labels representing respective software image recipe text outputs for the training inputs.

18. The system of claim 11, wherein the system is further configured to:

deploy the software component by executing the software image.

19. The system of claim 18, wherein the system is further configured to:

redeploy the software component when a cyber threat is detected with respect to the software component, wherein redeploying the software component further comprises rebuilding the software image using an updated version of at least one software package of the plurality of software packages.

* * * * *